(12) United States Patent
Berger et al.

(10) Patent No.: US 7,809,678 B2
(45) Date of Patent: Oct. 5, 2010

(54) FACT DIMENSIONS IN MULTIDIMENSIONAL DATABASES

(75) Inventors: Alexander Berger, Sammamish, WA (US); Edward Melomed, Kirkland, WA (US); Amir Netz, Bellevue, WA (US); Cristian Petculescu, Redmond, WA (US); Akshai M. Mirchandani, Redmond, WA (US); Mosha Pasumansky, Redmond, WA (US); Marius Dumitru, Issaquah, WA (US); Richard R. Tkachuk, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 11/135,718

(22) Filed: May 24, 2005

(65) Prior Publication Data

US 2006/0010113 A1      Jan. 12, 2006

Related U.S. Application Data

(60) Provisional application No. 60/586,501, filed on Jul. 9, 2004.

(51) Int. Cl.
*G06F 17/00* (2006.01)
*G06F 15/16* (2006.01)
(52) U.S. Cl. .................. 707/606; 707/600; 707/605
(58) Field of Classification Search .............. 707/1, 707/2, 3, 103, 104, 102, 600, 605, 606, 737, 707/797
See application file for complete search history.

(56) References Cited

U.S. PATENT DOCUMENTS

| | | | |
|---|---|---|---|
| 5,359,724 A | | 10/1994 | Earle |
| 5,918,232 A | * | 6/1999 | Pouschine et al. ........ 707/103 R |
| 5,940,818 A | * | 8/1999 | Malloy et al. ................ 707/2 |
| 5,978,788 A | | 11/1999 | Castelli et al. |
| 6,189,004 B1 | * | 2/2001 | Rassen et al. ................ 707/3 |
| 6,205,447 B1 | | 3/2001 | Malloy |
| 6,212,524 B1 | * | 4/2001 | Weissman et al. .......... 707/600 |
| 6,223,171 B1 | | 4/2001 | Chaudhuri et al. |
| 6,317,750 B1 | * | 11/2001 | Tortolani et al. ........ 707/103 R |
| 6,434,544 B1 | | 8/2002 | Bakalash et al. |
| 6,542,895 B1 | | 4/2003 | DeKimpe |
| 6,578,028 B2 | * | 6/2003 | Egilsson et al. ............... 707/2 |
| 6,651,055 B1 | * | 11/2003 | Kilmer et al. ................ 707/3 |
| 6,721,760 B1 | * | 4/2004 | Ono et al. ............... 707/104.1 |
| 6,775,675 B1 | | 8/2004 | Nwabueze et al. |
| 6,877,006 B1 | | 4/2005 | Vasudevan |
| 6,901,406 B2 | | 5/2005 | Nabe et al. |

(Continued)

OTHER PUBLICATIONS

OA dated Jan. 26, 2009 for U.S. Appl. No. 11/167,413, 25 pages.

(Continued)

*Primary Examiner*—Greta L Robinson
*Assistant Examiner*—Dennis Truong
(74) *Attorney, Agent, or Firm*—Workman Nydegger

(57) ABSTRACT

The subject invention pertains to systems and methods for interacting with fact dimensions. In particular, systems and methods are disclosed that optimize performance and scalability with respect to processing queries that involve fact dimensions. Furthermore, queries involving fact dimensions can be evaluated in distinct manners. For instance, queries can be processed such that regular dimensions restrict the scope of the data and only fact dimension members that are relevant to that scope are exposed.

9 Claims, 13 Drawing Sheets

U.S. PATENT DOCUMENTS

| | | | |
|---|---|---|---|
| 6,970,874 B2 * | 11/2005 | Egilsson et al. | 707/803 |
| 7,562,086 B2 | 7/2009 | Mirchandani | |
| 2002/0087633 A1 | 7/2002 | Nelson | |
| 2002/0087686 A1 | 7/2002 | Cronk | |
| 2002/0099692 A1 * | 7/2002 | Shah et al. | 707/2 |
| 2004/0059724 A1 * | 3/2004 | Petculescu et al. | 707/3 |
| 2004/0215626 A1 * | 10/2004 | Colossi et al. | 707/100 |
| 2004/0225692 A1 | 11/2004 | Pasumansky et al. | |
| 2005/0010565 A1 * | 1/2005 | Cushing et al. | 707/3 |
| 2005/0065939 A1 * | 3/2005 | Miao | 707/100 |
| 2005/0076067 A1 * | 4/2005 | Bakalash et al. | 707/200 |
| 2005/0283488 A1 * | 12/2005 | Colossi et al. | 707/100 |
| 2006/0010143 A1 | 1/2006 | Netz | |

OTHER PUBLICATIONS

Wil Blake et al., Delta Service in a Mobile File System Client Cache, 1998, IEEE pp. 222-228.
Office Action dated Sep. 19, 2007 cited in U.S. Appl. No. 11/167,413.
Office Action dated Mar. 5, 2008 cited in U.S. Appl. No. 11/167,413.
Office Action dated Aug. 11, 2008 cited in U.S. Appl. No. 11/167,413.
Notice of Allowance dated Apr. 13, 2009 cited in U.S. Appl. No. 11/167,413.
Office Action dated Aug. 8, 2007 cited in U.S. Appl. No. 11/137,232.
Office Action dated Apr. 25, 2008 cited in U.S. Appl. No. 11/137,232.
Office Action dated Jan. 8, 2009 cited in U.S. Appl. No. 11/137,232.
Office Action dated Jul. 20, 2009 cited in U.S. Appl. No. 11/137,232.
Office Action dated Feb. 23, 2010 cited in U.S. Appl. No. 11/137,232.

* cited by examiner

FACT DIMENSIONS IN MULTIDIMENSIONAL DATABASES

CROSS-REFERENCE TO RELATED APPLICATIONS

This application claims the benefit of U.S. Provisional Application Ser. No. 60/586,501, filed Jul. 9, 2004, and entitled SYSTEMS AND METHODS THAT FACILITATE USAGE OF DATABASES. The entirety of this application is incorporated herein by reference.

TECHNICAL FIELD

The subject invention relates generally to multidimensional database systems and more particularly toward multidimensional model structures and processing thereof.

BACKGROUND

Data warehousing and online analytical processing (OLAP) are widespread technologies employed to support business decisions and data analysis. A data warehouse is a nonvolatile repository for an enormous volume of organizational or enterprise information (e.g., 100 MB-TB). These data warehouses are populated at regular intervals with data from one or more heterogeneous data sources, for example from multiple transactional systems. This aggregation of data provides a consolidated view of an organization from which valuable information can be derived. Though the sheer volume can be overwhelming, the organization of data can help ensure timely retrieval of useful information.

Data warehouse data is often stored in accordance with a multidimensional database model. Conceptually, in multidimensional database systems, data is represented as cubes with a plurality of dimensions and measures, rather than relational tables with rows and columns. A cube includes groups of data such as three or more dimensions and one or more measures. Dimensions are a cube attribute that contains data of a similar type. Each dimension has a hierarchy of levels or categories of aggregated data. Accordingly, data can be viewed at different levels of detail. Measures represent real values, which are to be analyzed. The multidimensional model is optimized to deal with large amounts of data. In particular, it allows users to execute complex queries on a data cube. At present, OLAP is almost synonymous with multidimensional databases.

OLAP is a key element in a data warehouse system. OLAP describes a category of technologies or tools utilized to retrieve data from a data warehouse. These tools can extract and present multidimensional data from different points of view to assist and support managers and other individuals examining and analyzing data. The multidimensional data model is advantageous with respect to OLAP as it allows users to easily formulate complex queries, and filter or slice data into meaningful subsets, among other things. There are two basic types of OLAP architectures MOLAP and ROLAP. MOLAP (Multidimensional OLAP) utilizes a true multidimensional database to store data. ROLAP (Relational OLAP) utilizes a relational database to store data but is mapped so that an OLAP tool or application sees the data as multidimensional. HOLAP (Hybrid OLAP) is an amalgam of both MOLAP and ROLAP.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention relates to systems and methods of interacting with fact dimensions in multidimensional databases. Fact dimensions are a special type of dimension defined during multidimensional design whose size and granularity are the same or close to the size and granularity of a fact table associated therewith. The fact dimension provides a user with the ability to retrieve important information related to the most granular facts in multidimensional databases. The unique status of the fact dimension in relation to other dimensions merits special processing to ensure optimal performance and scalability. Additionally, the results produced upon evaluation of a query involving a fact dimension can also be influenced differently from those specified on a regular or standard dimension.

In accordance with an aspect of the invention, a query processing system is provided to facilitate processing of these special fact dimensions. The system can include a receiver component that receives queries involving fact dimensions and a query processor component that evaluates the queries with respect to multidimensional data. The processor component can process queries differently depending on the manner in which the fact dimension is specified within the query. If the query specifies particular fact dimension members or facts to be retrieved or utilized to define the scope of the query, then such specific members can be utilized to define the scope. Alternatively, the processor component can utilize regular dimensions to define the scope of the query and retrieve or expose only fact dimension members or facts that are relevant to that scope.

In accordance with an aspect of the invention, the query processor component can materialize a fact dimension during a query process such that it includes only relevant members or facts. An attempt to query the fact dimension directly prior to its materialization would result in the return of an empty result set and/or an error.

In accordance, with an aspect of the invention, an interface system is provided to facilitate interaction with the query processor systems of the subject invention.

In accordance with other aspects of the subject invention, a plurality of query processing methodologies are also provided to facilitate efficient and scalable processing of queries involving fact dimensions, among other things. For instance, a query processing methodology can include receiving a query, processing the querying with respect to regular dimension to generate an intermediate result set limiting the scope of data, receiving fact dimension members that correspond to intermediate result set, generating a result set, and returning results.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Figure 1:
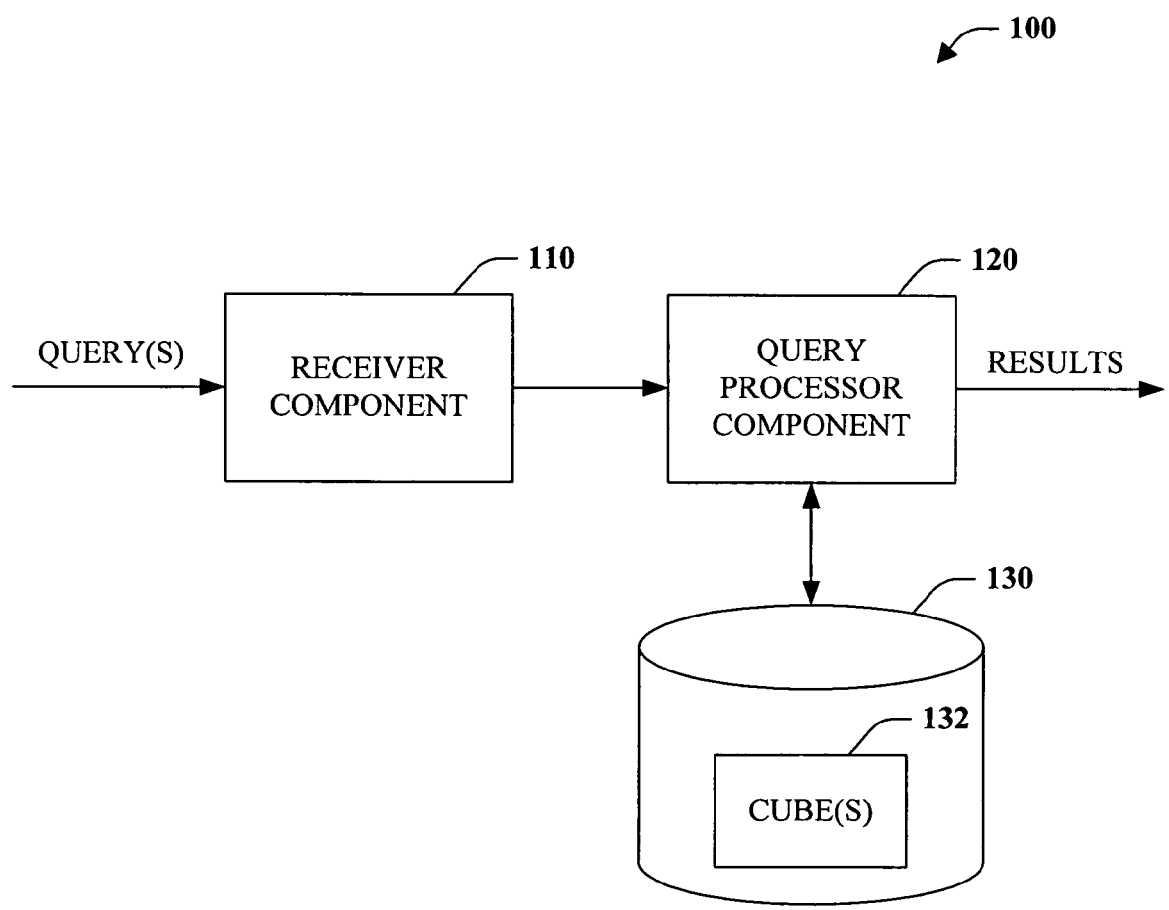
FIG. 1 is a block diagram of a query processing system in accordance with an aspect of the subject invention.

Turning initially to FIG. 1, a query processing system 100 is depicted in accordance with an aspect of the subject invention. Query processing system 100 can include a receiver component 110, a processor component 120. The receiver component 110 receives queries. Queries are formal questions or requests for specified data. By way of example and not limitation, such queries can be MDX (Multidimensional Expression) queries. According to an aspect of the invention, the queries received can include or reference one or more fact dimensions and/or members thereof.

Fact dimensions (also referred to as degenerate dimensions) are a special type of dimension in a multidimensional database. Their separate and special status lies in the fact that their size and granularity are close to that of a fact table. A fact dimension can often have, but is not limited to, a one-to-one relationship with a fact table. These dimensions enable designers of multidimensional databases to expose very granular information related to facts. This gives users the ability to request and retrieve important information related to the most de minimus facts of multidimensional databases. Defining fact dimensions as a separate type of dimension is an important step in multidimensional database design. Further, recognizing what part of multidimensional data should be treated as a separate type of dimension is of high value to the designer of a multidimensional database.

A fact dimension can be defined on any type including both numeric and non-numeric data. However, such a dimension is common for data that are not facts in the strictest sense, in that it would not make sense to add such data together, to aggregate such data, averaged or subject the data to other types of mathematical operations. For instance, fact dimensions can be defined for order numbers, invoice numbers, transaction numbers, purchase order numbers, policy numbers, and claim numbers among others. The most common example in multidimensional analysis is "orders" which can serve both as fact table and as fact dimension. Consider, for example, a multidimensional database including dimensions Product, Time, and Geography as well as a fact table Orders. Orders are interesting not solely for their numeric value, but also for additional information associated with a particular order. Orders, in many cases, might have such properties as OrderOrigin, OrderDescription, OrderReference, and the like. Exposing such properties of orders can be very important to a user. The way to expose these non-numeric properties would be to include them as attributes of a dimension in a multidimensional model. It should be readily apparent that the granularity and size of such a dimension is close or similar to one of the fact table. Consequently, they will need be treated and/or processed differently than regular dimensions.

The queries received by receiver component 110 can include fact dimensions and/or members to limit, filter, and/or retrieve particular data. For example, a query can ask for all the properties of an Order for Geography.Country=USA, Time.Year=1996 and Product.ProductName="Coca Cola." Assuming ROLAP storage for multidimensional database, one can represent such request in at least two different ways. The following are two exemplary queries in a generic query language.

Select * from OrderPart1, Orders

Where

Country.Geography='USA',

Year.Country='1996',

Product.ProductName='Coca Cola',

Where OrderPart1.OrderKey=Order.OrderKey

This query could be sent for every one of the partitions represented by tables OrderPart1 and the like. Another way of retrieving the same information is to create a single view (described in more detail infra) the purpose of which is to perform the union of all partitions in Orders, measure group. In this case, the query could be written as follows:

Select * from Fact, Orders

Where

Country.Geography='USA',

Year.Country='"1996',

Product.ProductName='Coca Cola'

Where Fact.OrderKey=Order.OrderKey

Here Fact is a view uniting all partitions in Orders Measure group.

Receiver component 110 is communicatively coupled to query processor component 120. Accordingly, receiver component 110 can transmit the received query to the processor component 120. Upon receipt of the query from receiver component 110, processor component 120 can process or evaluate the query as wells as return results. The processor component 120 evaluates the query against data structures. As illustrated, processor component can be communicatively coupled to data store 130. Data store 130 can include data structures such as one or more multidimensional cubes 132 or tables modeled as cubes. Processing a query that involves specific fact dimension members can be processed similar to typical queries, however the processing of queries that seek to filter or slice and dice based on a fact dimension necessitates unique processing for purposes of efficiency and scalability.

A fact dimension is distinct from regular dimension at least because the cardinality of the dimension is defined by the cardinality of dimension data. For example, a company could produce or market millions of products, yet the number of orders for each product would but significantly larger. The same would be true with respect to customers. If a company has twenty million customers, this still is much less than the number of orders these customers will produce. The number of orders could be billions. If a fact dimension were defined on orders, in this scenario, as a one-to-one relationship then the fact dimension would be unmanageable, at best, as a regular dimension.

Figure 2:
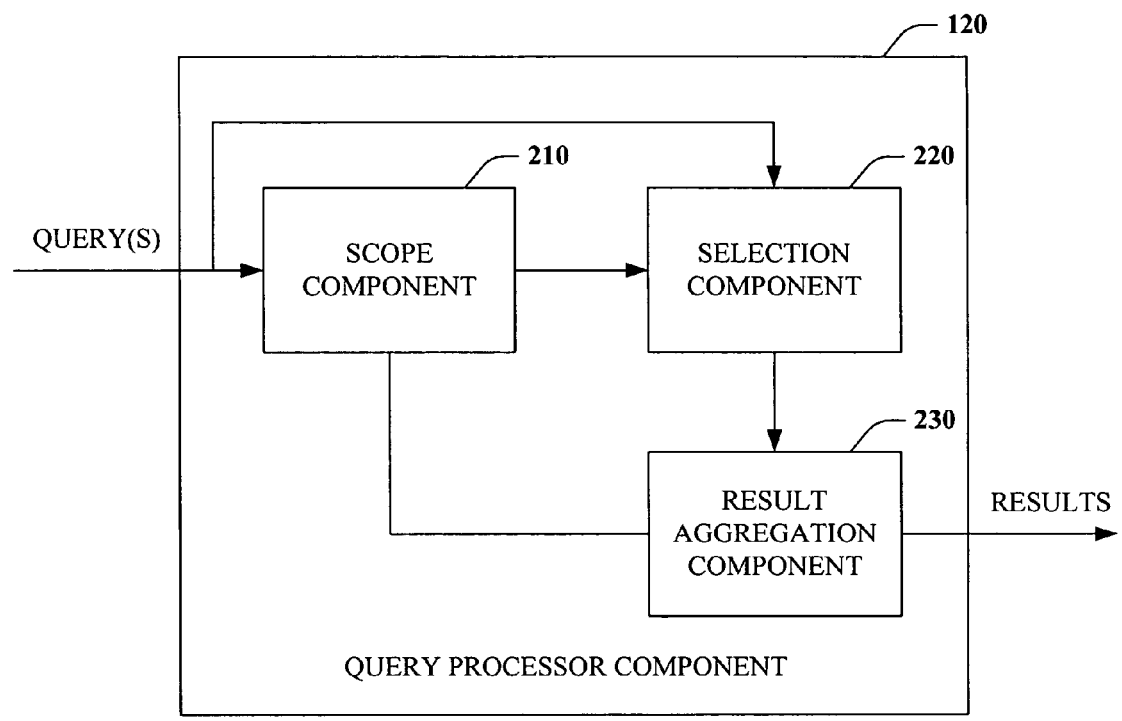
FIG. 2 is a block diagram of a query processing component in accordance with an aspect of the subject invention.

Turning to FIG. 2, a query processor component 120 is illustrated in accordance with an aspect of the subject invention. Query processor component 120 can include a scope component 210 and a selection component 220. The scope component 210 can filter data or limit the scope of data based on the received query and regular dimension(s) and member(s) specified thereby. The scope component 210 thus refines or reduces the scope of data. Such processing by the scope component 210 can consequently produce an intermediate result set or data corresponding thereto. This intermediate result set can be passed, transmitted or otherwise communicated to selection component 220. Selection component 220 can select and/or expose members of the fact dimension 220 that correspond to the members produced by the scope component 210 in the intermediate result set. In other words, information is exposed or selected from the fact dimension that is relevant only to the scope of the request. The result aggregation component 230 can receive the intermediate result set from the scope component 210 and the selected members of the fact dimension from selection component 220 and aggregate such data to produce a final result set to be output.

To facilitate clarity and understanding, consider a cross join that is performed between regular members and a fact dimension members. In this exemplary scenario, only members of the fact dimension that correspond to select regular members will be returned. By contrast if a cross join is performed on two regular dimensions such as product and customer, all the customers are going to be shown with respect to all of the products. Thus, the fact dimension with noted exceptions does not define the scope of a query request or generated result set.

Figure 3:
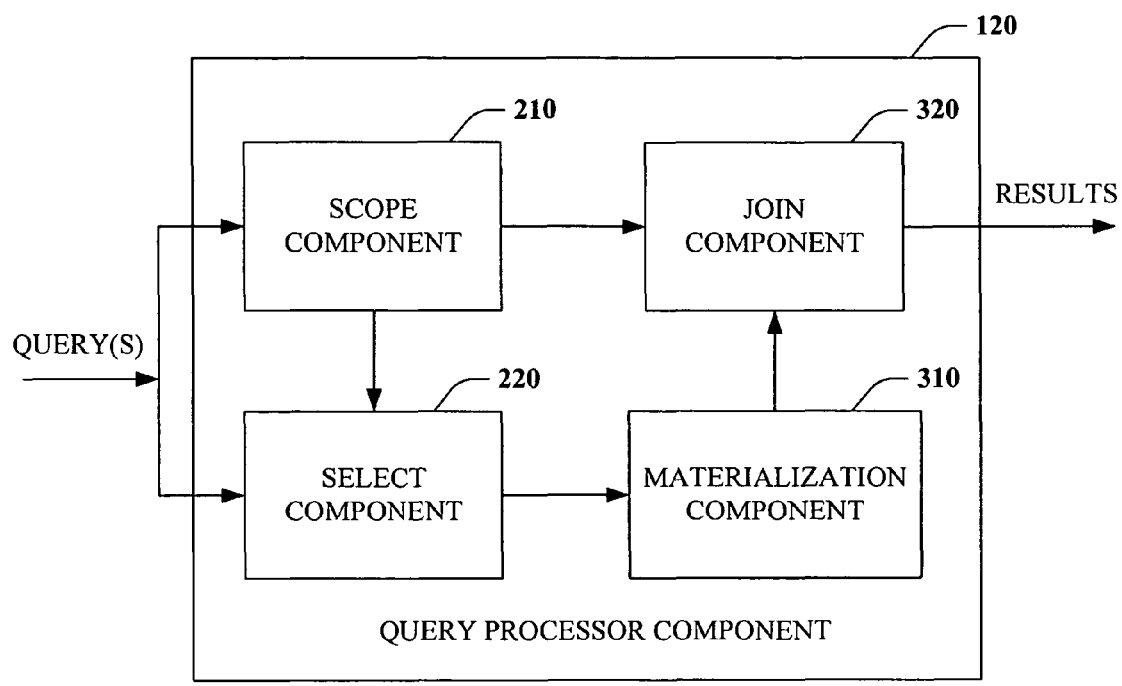
FIG. 3 is a block diagram of a query processing system in accordance with an aspect of the subject invention.

FIG. 3 depicts a processor component 120 in accordance with an aspect of the subject invention. Component 120 includes scope component 210, select component 220, materialization component 310, and join component 320. Scope component 210 receives a query and limits the scope of the data request in accordance with one or more standard dimensions or members thereof. This limited data set or intermediate result set can then be communicated to the select component 220. Select component 220 can also receive identification of a fact dimension from a query. Select component 220 can then identify fact data that corresponds to the limited or intermediate result set. The identity of the fact data can then be provided to materialization component 310 that materializes or populates a fact dimension with the identified fact data, for example from the corresponding fact table. The join component 320 can then receive or retrieve the fact dimension and as well as the intermediary result set. Subsequently, the join component 320 can join the materialized fact dimension with the intermediary result set to produce aggregate results or a result set that satisfies the query.

Figure 4:
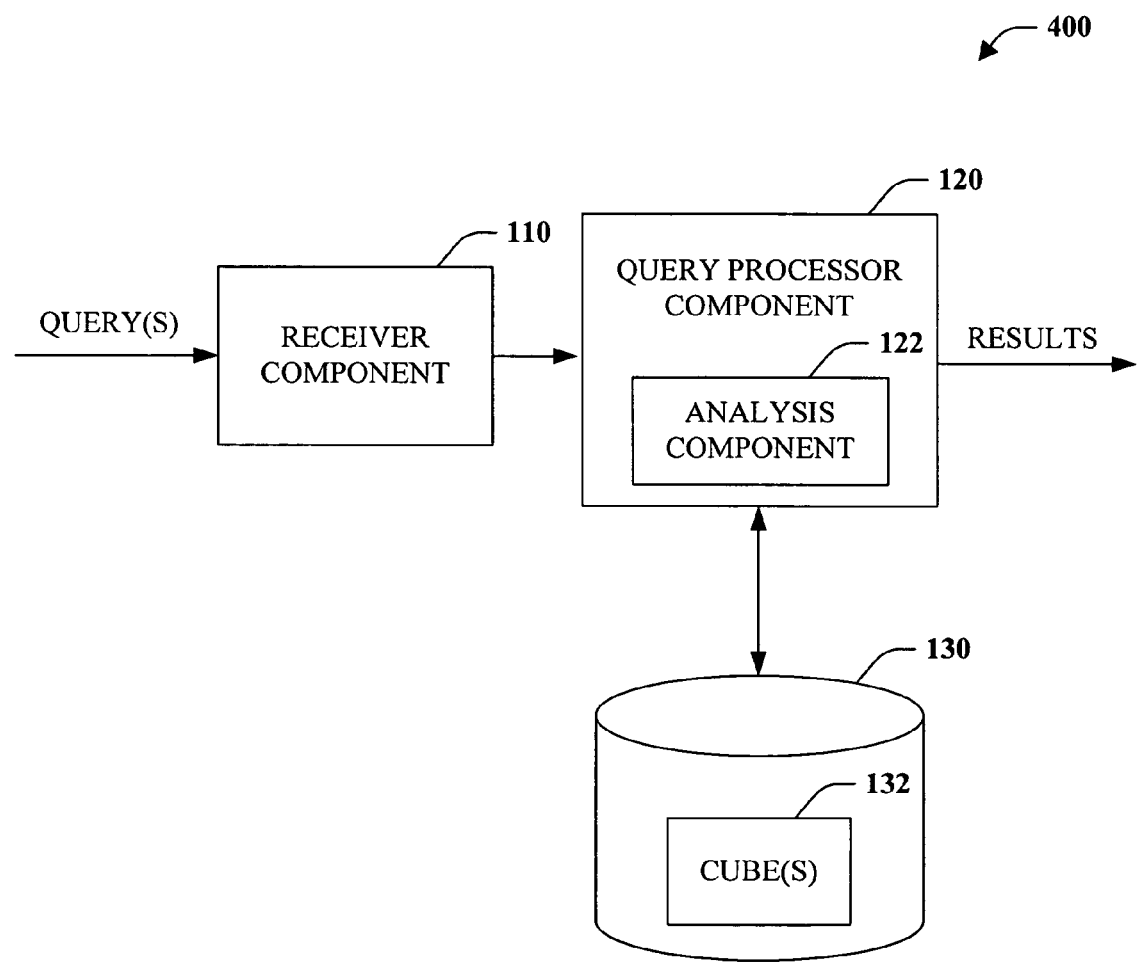
FIG. 4 is a block diagram of a query processing system in accordance with an aspect of the subject invention.

FIG. 4 illustrates a query processing system 400 in accordance with an aspect of the subject invention. System 400 similar to system 100 of FIG. 1 includes a receiver component 110, a query processor component 120, and a data store 130 comprising one or more multidimensional cube structures 132. As previously described, receiver component 110 can receive queries that, among other things, involve fact dimensions and one or more regular dimensions. Receiver component 110 is communicatively coupled to query processor component 120. Query processor component 120 processes or evaluates received queries with respect to a data store 130. In particular, query processor can be communicatively coupled to the data store 130, which includes one or more multidimensional database cubes 132. Hence, queries can be processed with respected to multidimensional cubes 132. Furthermore, query processor component 120 includes an analysis component 122. As mentioned, query processor component 120 can process queries that involve fact dimensions differently based on the manner in which the query is specified. For example, if specific fact dimensions are referenced or involved then the query can be processed as usual and the fact dimension is allowed to facilitate defining the query scope. However, if the query does not involve specific fact dimension members or facts, then the fact dimension does not participate in query scope definition with other regular members. Rather, only fact dimension information that is relevant to the scope of the request is exposed or selected. Analysis component can analyze or scrutinize the received queries to aid in identifying whether special processing will be necessary with respect to a fact dimension.

Figure 5:
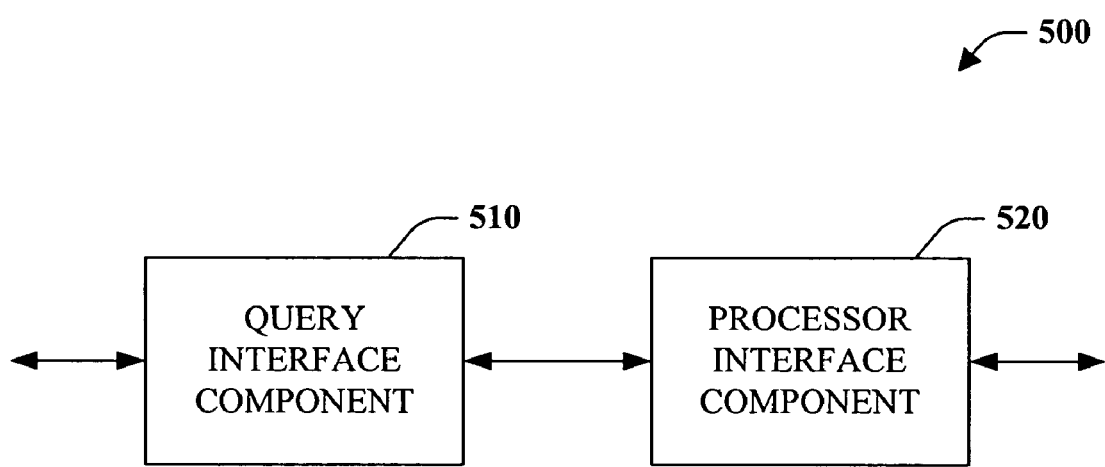
FIG. 5 is a block diagram of an interface system in accordance with an aspect of the subject invention.

FIG. 5 depicts an interface system 500 in accordance with an aspect of the subject invention. Interface system 500 can facilitate interaction with the query processing systems disclosed herein. Accordingly, system 500 can correspond to an application program interface (API), among other things. System 500 can include a query interface component 510 and a processor interface component 520. Query interface 510 is operable to receive queries form a user or other entity or application. Such queries can involve, include or reference a fact dimension. The query interface 510 can transmit or communicate the received query to the processor interface component 520. The processor interface component 520 can communicate with a query processing system such as those described herein and return results or a result set that satisfies the query. The result set can be transmitted or communicated from the processor interface component 520 to the query interface component 510. Upon receipt the query interface component 510 can return the results to the requesting entity. By way of example, the query interface 510 could receive and transmit to processor interface component 520 a query that specifies particular fact dimension members. In such an instance, the processor interface component 520 could return and query interface component 510 could receive a result set the scope of which is limited by the specific fact dimension members. Alternatively, the query interface component 510 could receive and transfer a multidimensional query that includes reference to an entire fact dimension to processor interface component 520. The processor interface component 520 could transmit a result set to the query interface component 410 that includes fact dimension facts that correspond to or are relevant with respect to the scope of data defined by regular or standard dimensions. In other words, the result set can include members of the fact dimension, which are accessible on the scope of one or more standard dimensions. The processor interface component 520, according to an aspect of the invention, will not return all the fact dimension measures, only those germane to the scope.

The aforementioned systems have been described with respect to the interaction between several components. It should be appreciated that such systems can include those components specified therein, some of the specified components, and/or additional components specified in other systems. Additionally, it should be noted that one or more components may be combined into a single component providing aggregate functionality or divided into several subcomponents. The components may also interact with or be integrated with one or more other components or systems not specifically described herein but known by those of skill in the art.

Furthermore, as will be appreciated by artisans of ordinary skill in this field, various portions of the disclosed systems above and methods below may include or consist of artificial intelligence or knowledge based components, sub-components, processes, means, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as well as efficient.

In view of the exemplary systems described supra, methodologies that may be implemented in accordance with the present invention will be better appreciated with reference to the flow charts of FIGS. 6-9. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
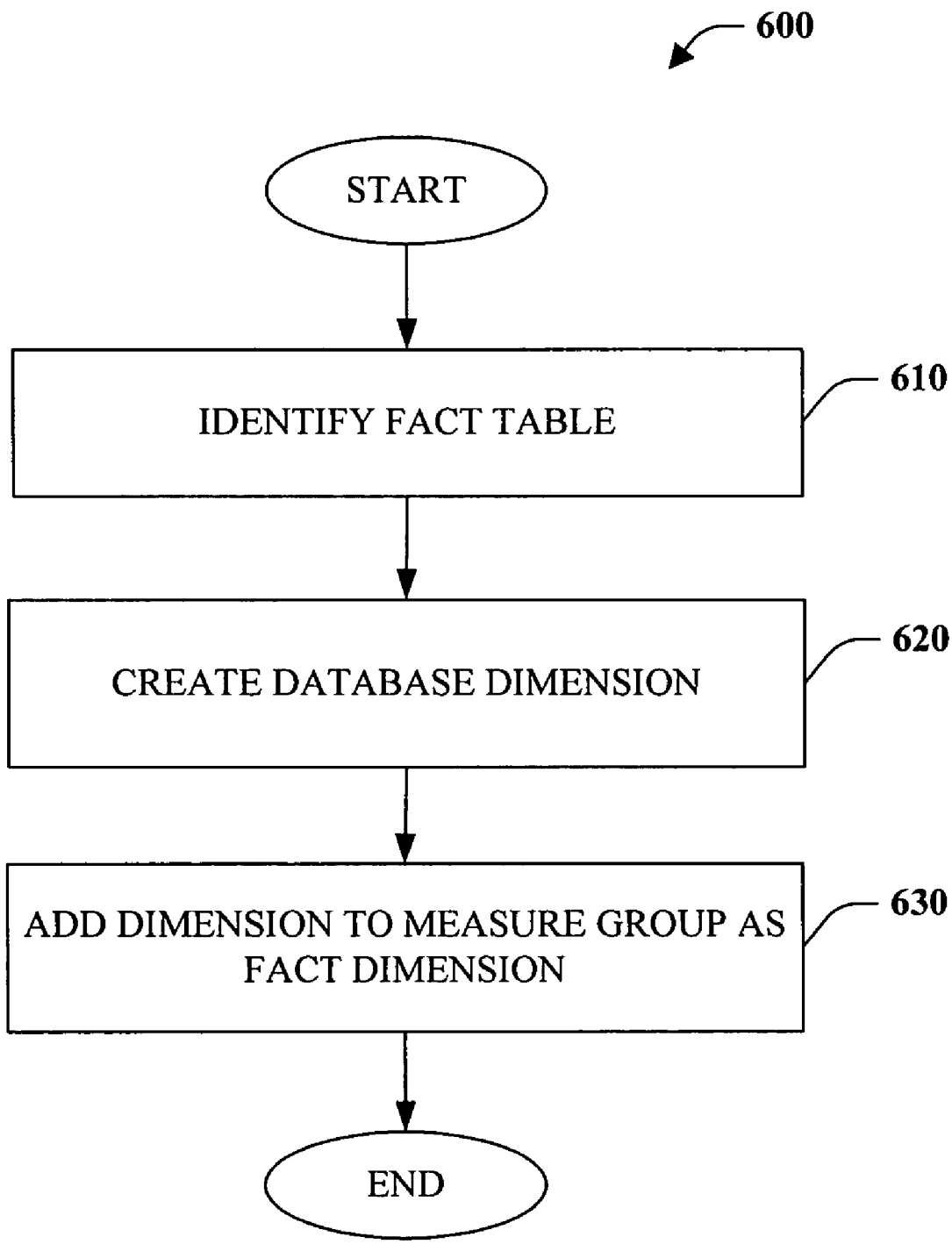
FIG. 6 is a flow chart diagram of a fact dimension generation methodology in accordance with an aspect of the subject invention.

Turning to FIG. 6, a fact dimension generation methodology 600 is depicted in accordance with an aspect of the subject invention. Fact dimensions are a special type of dimension. For example, the fact dimension can have a one to one (1:1) relationship with facts, although not limited to such a relationship. At reference numeral 610, a fact table can be identified. For instance, consider the following fact table:

| Transaction_id | Product_id | Time_id | Sales_cost |
|---|---|---|---|
| 12312 | 12 | 3 | 432 |
| 34232 | 12 | 2 | 23 |
| 12323 | 43 | 33 | 23 |
| 23423 | 34 | 43 | 43 |
| 23434 | 32 | 3 | 425 |

It may be important in various cases to be able to create a dimension that is based on fact table attribute Transaction_id, for instance to enable an application or user to query or utilize Transaction_id in multidimensional expressions (MDX) to analyzed a particular transaction. At 620, a database dimension can be created such as but not limited to a ROLAP database dimension. The dimension could also be a MOLAP database dimension. The fact dimension storage mode could correspond to ROLAP, MOLAP, or HOLAP. At 630, the database dimension can be added to a measure group as a fact dimension. The fact dimension can thus be defined as a subclass of a measure group dimension, in accordance with an aspect of the invention.

It should be appreciated that some special action may need to be taken based with respect to partitions and a measure group. The simpler case is where there is one partition and no updates are merged into the fact table. In this instance, the fact dimension can be defined from the same table as a measure group. A more complicated situation arises when there are multiple partitions or updates to the measure group are coming from different table. Here, in order to maintain data consistency in the database that contains a fact dimension on top of partitioned group, a separate view in the relational database should be built. Such a view would logically unite all partition tables. Furthermore, incremental updates to a measure group, which are made using separate tables, should also require maintenance of a relational database view.

Figure 7:
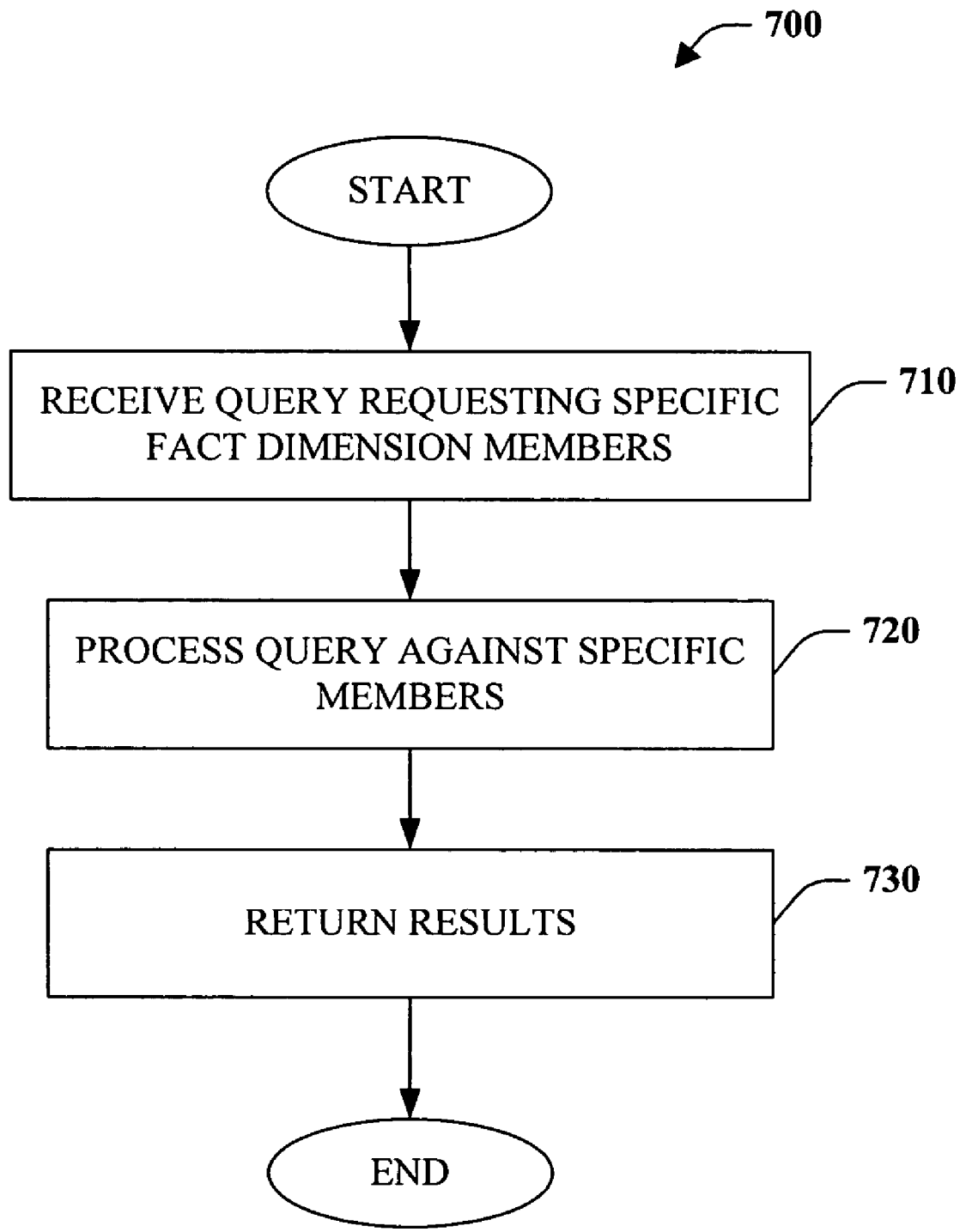
FIG. 7 is a flow chart diagram of a query processing methodology in accordance with an aspect of the subject invention.

FIG. 7 illustrates a query methodology 700 in accordance with an aspect of the subject invention. At reference numeral 710, a query is received that requests specific fact dimension members or attempts to limit the scope of the query to specific fact dimension members. At 720, the query can be processed or evaluated with respect to the specific members (e.g., transaction_id=12312 . . . ). Processing or evaluation of the query can result in production of results or a result set. At 720, the result set can be returned to the entity providing the query. In this manner, evaluation of a fact dimension with respect to specific members can be similar to evaluation of a standard or regular dimension.

Figure 8:
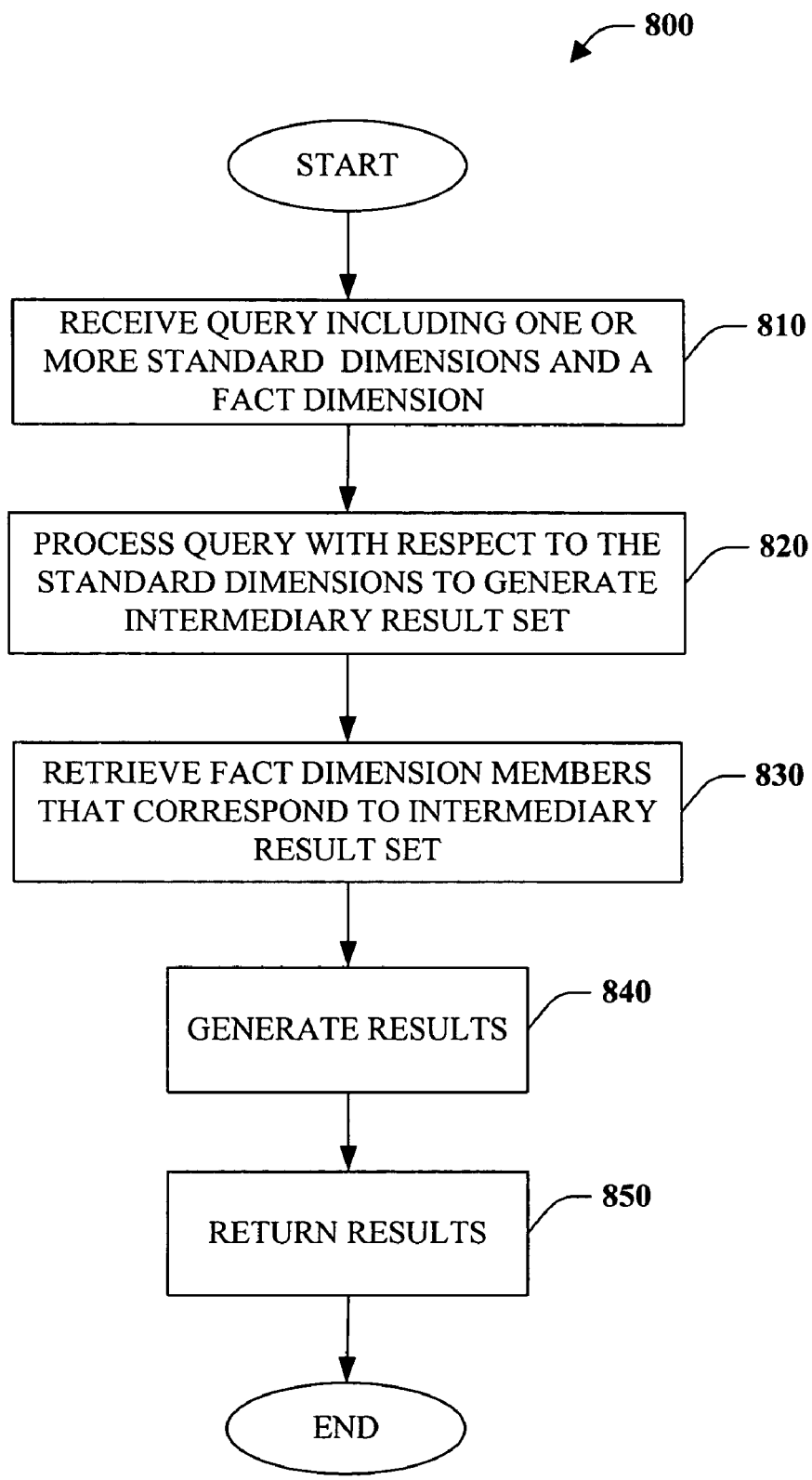
FIG. 8 is a flow chart diagram of a query processing methodology in accordance with an aspect of the subject invention.

FIG. 8 depicts a query methodology 800 in accordance with an aspect of the subject invention. At reference numeral 810, a query can be received that includes one or more standard or regular dimensions and a fact dimension. At 820, the query is processed with respect to the standard dimensions to generate an intermediate result set. The standard dimensions thus filter or scope the query request. At reference 830, fact dimension members are retrieved that correspond to the intermediate result set that is scoped by the regular dimensions. At 840, results are generated from the intermediate result set and the corresponding fact dimension members. At 850, the generated result set is returned to the query issuing entity. Here, only the regular dimensions are able to scope or filter the request. Furthermore, not all fact dimensions members are returned, only those relevant to the intermediate result set or data scope.

Figure 9:
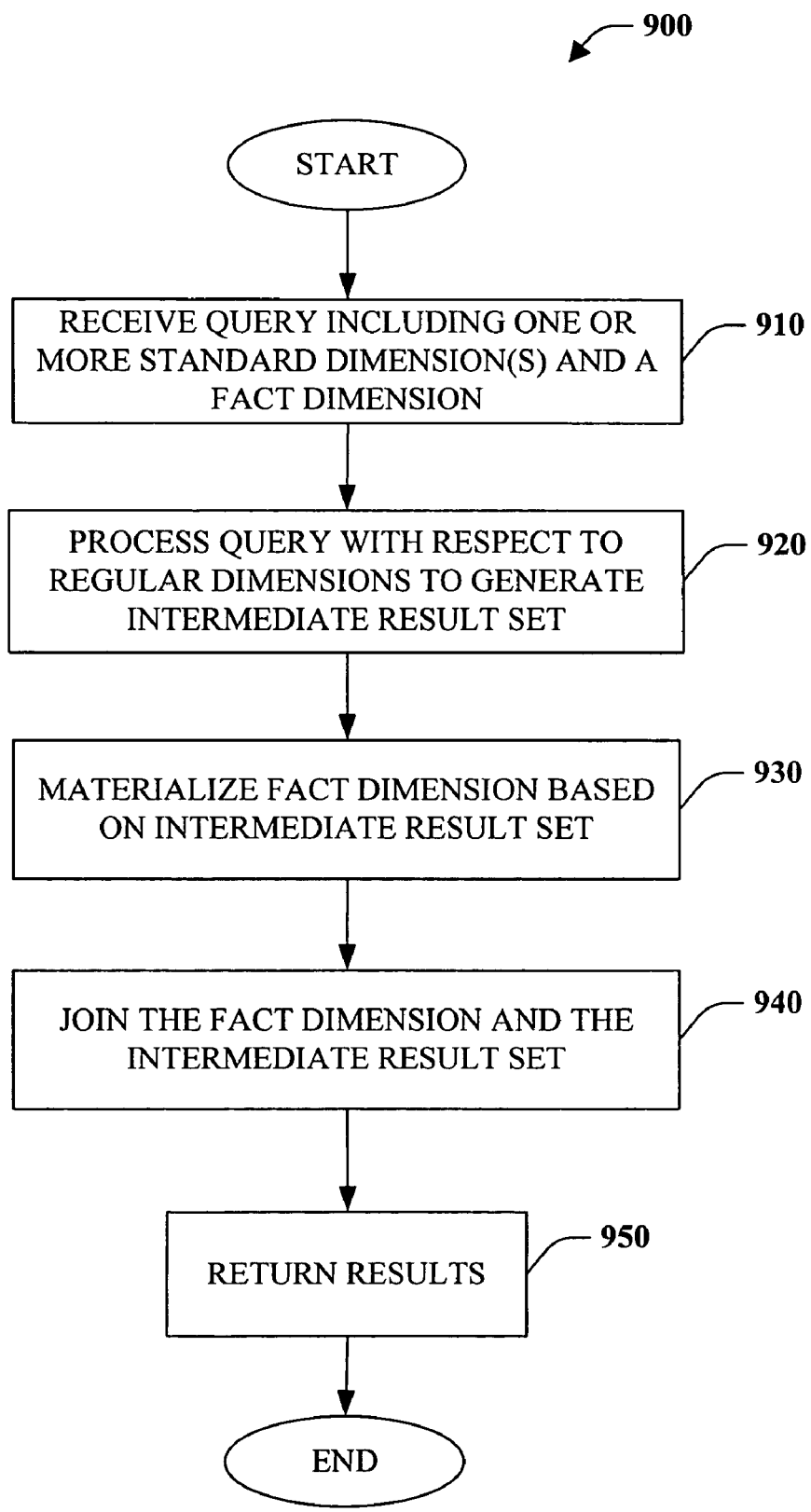
FIG. 9 is a flow chart diagram of a query processing methodology in accordance with an aspect of the subject invention.

FIG. 9 illustrates a query processing methodology 900 in accordance with an aspect of the subject invention. At reference numeral 910, a query is received including one or more standard or regular dimensions and a fact dimension. At 920, the standard dimensions are processed against a data store to produce an intermediate result set. Thus, the standard dimensions scope or filter the results. Furthermore, it should be appreciated that the intermediate result set produced can take the form of a table. At 930, the fact dimension can be materialized based on the intermediate results generated. In particular, the fact dimension can be populated with fact dimension members or facts that correspond to the intermediate results. This fact dimension can take the form of a table. At 940, the fact dimension and the result set can be joined to produce a result set. At 950, the produced result set is returned, for example to the entity providing the query. Here, again, the scope of the query is defined by the regular dimensions and only relevant fact dimension members are produced. Furthermore, the fact dimension is materialized during the query processing methodology. The fact dimension is only populated with a subset of members or facts. Thus, if a user sought to retrieve all the fact dimension members, they would not be allowed to do so, as the fact dimension although defined does not include all the fact dimension members. Alternatively, a user could simply receive an empty result set and/or an error. Moreover, this methodology provides for efficient as well as scalable processing, as the query processing is not evaluated with respect to a complete set of fact dimensions.

Figure 10:
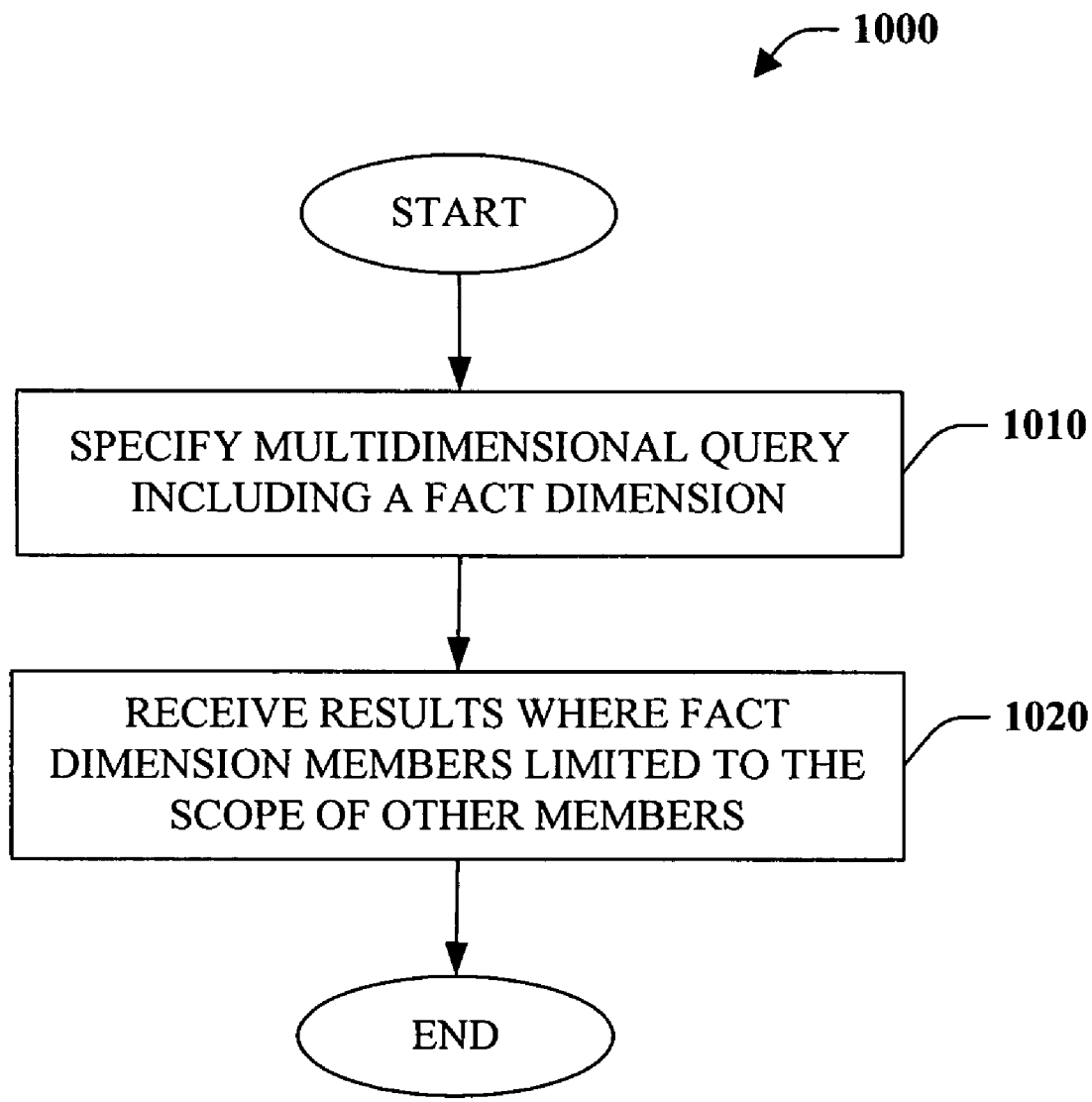
FIG. 10 is a flow chart diagram of a query methodology in accordance with an aspect of the subject invention.

FIG. 10 depicts a flow chart diagram of a query methodology 1000 in accordance with an aspect of the subject invention. At reference numeral 1010, a multidimensional query is specified which involves, includes or references a fact dimension or non-specific members thereof and at least one other regular dimension. At 1020, the result set that satisfies the query is return with fact dimension members limited to the scope defined by the other members. The fact dimension does not define the scope here and only facts or fact members relevant to other selected members are returned.

Figure 11:
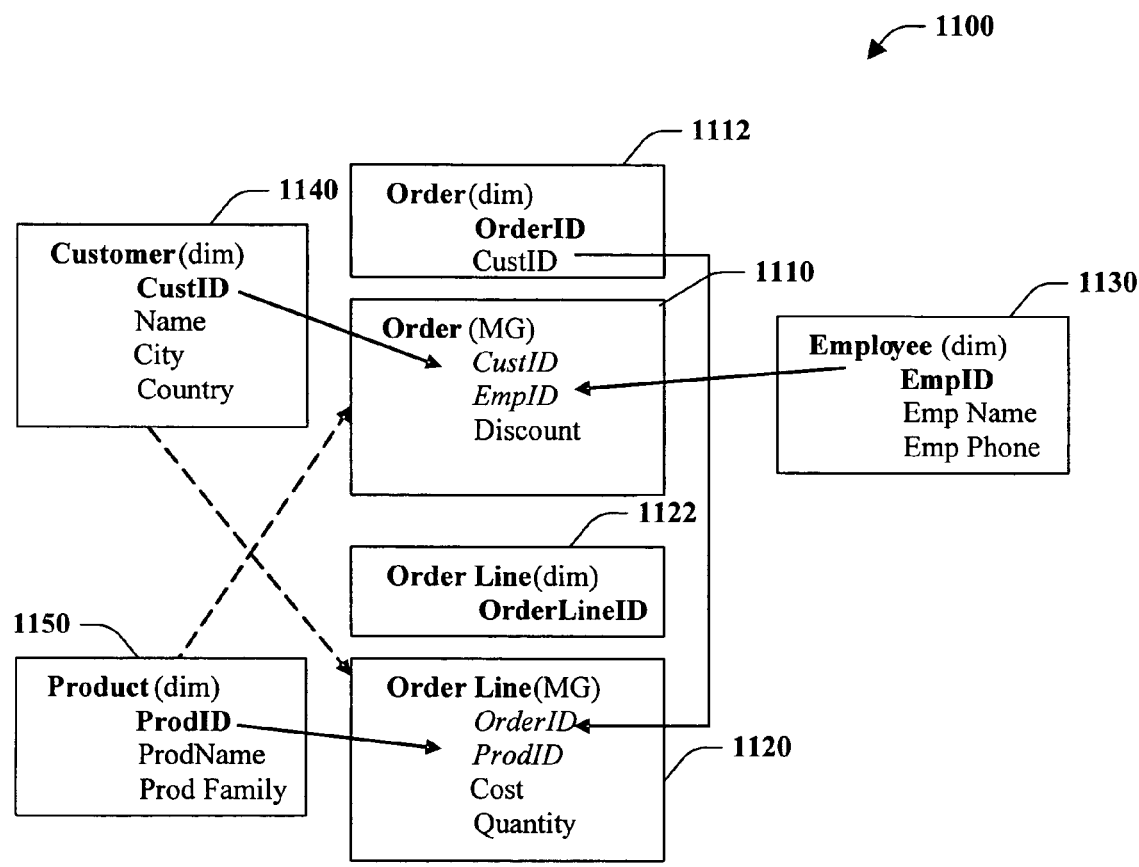
FIG. 11 illustrates an exemplary cube to facilitate clarity and understanding of aspects of the subject invention.

The following section provides a discussion of various aspects of the subject invention through various examples. It should be appreciated that these examples are not intended to limit the scope of the invention but rather to provide context for description of aspects of the invention such as functions or roles of fact dimensions. Turning to FIG. 11, a graphical depiction of exemplary data cube 1100 is illustrated. Cube 1100 is an "Orders" cube. Cube 1100 includes two fact tables or measure groups for order 1110 and order line 1120. Additionally, each measure group includes a fact dimension, namely order fact dimension 1112 that corresponds to order measure group 1110 and order line fact dimension 1122 that corresponds to order line measure group 1120. Furthermore, the cube 1100 includes a plurality of other dimensions including employee dimension 1130, customer dimension 1140 and product dimension 1150. From the aforementioned description, it should be appreciated that queries that involve a fact dimension can be evaluated differently from queries involving regular dimensions.

Consider the following query for cube 1100:

Select [Order].[OrderId].members on 0

From [Orders]

Where [Customer].&[Marin]

In this case, if the order dimension 1112 was not recognized as a fact dimension or degenerate dimension, this query would return all members of the Order dimension on rows. However, the query would return data for only one customer. If the server or query processor recognizes the Order dimension as a fact dimension then, only orders that have any data for [Customer].&[Marin] will be returned. The query could be written in an opposite way to have the same non-empty behavior. For example:

Select [Customer][Name].members on 0

From [Orders]

Where [Order].&[123345]

Here the query processor will retrieve the customer name for the specific order.

However, one should be able to submit and receive correct results for the following type of query:

Select [Customer].&[Marin] on 0

From [Orders]

Where [Measures].[Cost]

In this query, Customer dimension 1140 is defined as referenced to Order Line measure group 1120, from which the Cost measure is coming. This is represented by the dotted line in cube 1100. The reference is defined utilizing the fact dimension order 1112 and more specifically its attributes Order id and customer id. In order to reference Employee dimension 1130, one would need to include EmpID as attribute in Order dimension 1110. The query processor can resolve this query correctly and perform an automatic non-empty. The result of such a query will be the collective cost of all orders that have been placed only by customer Marin.

Another query could be "list of all the products with their cost purchased by Marin," denoted as follows:

Select [Customer].& Marin on 0

From [Orders]

Where [Measures].[Cost]

The dotted line from Product dimension 1150 to Order measure group 1110 indicates that Product dimension 1150 is defined to have many-to-many relationships with Order fact dimension 1112, using order line 1120 as a many-to-many measure group. Once this relationship is defined, users or other entities are able to get answers to complex questions (for the OLAP world) such as list discounts that my customers received for [Product].[ProductName].&[PC]:

Select [Customers].[Name].members on 0,

[Product].[ProdName].&[PC] on 1

From [Orders]

Where [Measures].[Discount]

It should be noted here that since Orders 1112 is defined as a fact or degenerate dimension that the query processor will apply an automatic non-empty and will return only customers that purchased PC products.

There can also be a case where in the same cube there is a parent-child dimension and fact dimension at the same time. In cube 1100, Employee is a parent-child dimension and Order is a fact dimension. Consider the following query where there is an Employee dimension on rows and Sales measure on columns:

Select Employees.members on 0, Measures.members on 1

From Sales

The result set can look as follows:

| Manager | Employee | Sales |
|---------|----------|-------|
| Amir    |          | 8     |
| Amir    | Amir*    | NULL  |
| Amir    | Marin    | 5     |
| Amir    | Stephen  | 3     |

The Order dimension is not participating in the query. Its default member is set to All and therefore non-special treatment will apply. Consider an example where one wants to see the same numbers when specific order is selected from the Order dimension 1112.

Select Employees.members on 0, Measures.members on 1

From Sales

Where ([Orders].[OrderID].&[22])

In this case, one can see that one specific order contributed to the sales for employee Marin ([Orders][OrderID].&[22]) and therefore to his manager as well as presented:

| Manager | Employee | Sales |
|---------|----------|-------|
| Amir    |          | 2     |
| Amir    | Marin    | 2     |

Finally, consider a scenario where there is a fact dimension and null values. By way of example, consider the fact table populated as follows:

| Transaction_id | Product_id | Time_id | Sales | Sales_cost |
|----------------|------------|---------|-------|------------|
| 12312          | 12         | 1       | 431   | 432        |
| 34232          | 12         | 2       | NULL  | 23         |
| 12323          | 43         | 1       | 23    | 23         |
| 23423          | 34         | 2       | NULL  | NULL       |
| 23434          | 32         | 2       | 425   | 425        |

Here, Sales and Sales_cost include undefined or null values. Subsequently, a cube can be defined and built based on such a fact table. Consider the following query on such a generated cube:

Select Transactions.members on 0, Measures.Sales on 1

From Sales

Where ([Time_id].&[2])

The following result could be returned:

| Transaction_id | Sales |
|----------------|-------|
| 34232          | NULL  |
| 23423          | NULL  |
| 23434          | 425   |

Accordingly, the query processor can return all records that are present in the fact table regardless if some or all the measures exist.

Figure 12:
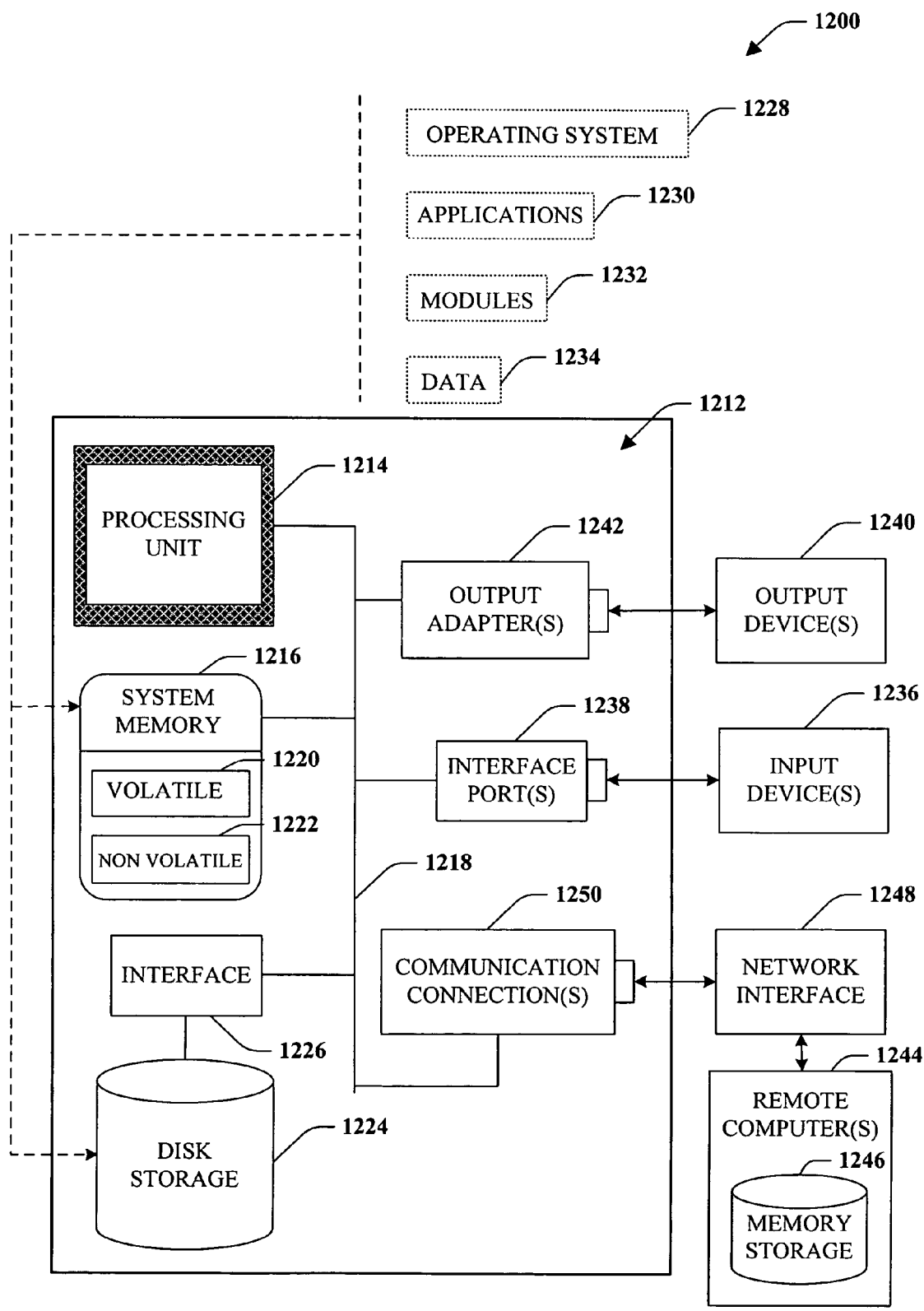
FIG. 12 is a schematic block diagram illustrating a suitable operating environment in accordance with an aspect of the present invention.
Figure 13:
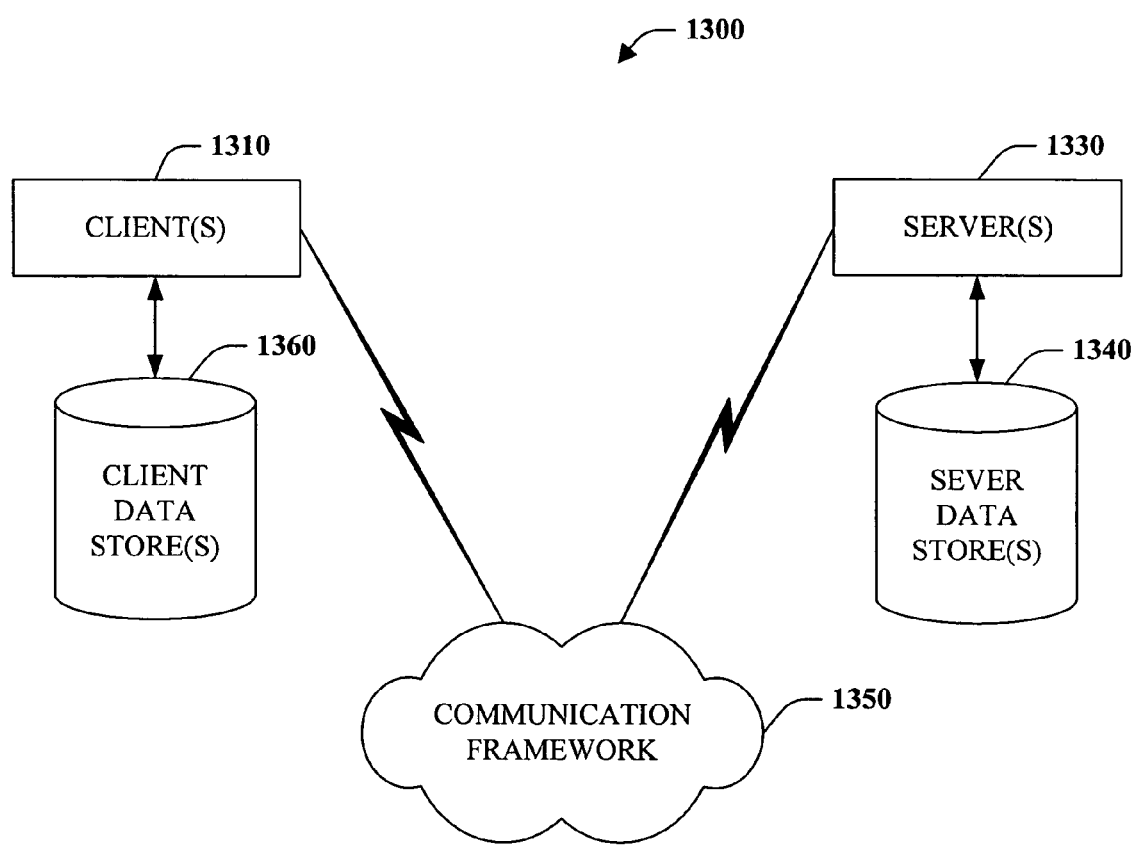
FIG. 13 is a schematic block diagram of a sample-computing environment with which the present invention can interact.

In order to provide a context for the various aspects of the invention, FIGS. 12 and 13 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multi-processor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The server(s) 1330 can house threads to perform transformations by employing the present invention, for example. One possible communication between a client 1310 and a server 1330 may be in the form of a data packet transmitted between two or more computer processes. The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A query processor system comprising at least one processor that executes the following components:
   a component that receives input for defining a fact dimension, wherein the fact dimension is defined by performing the following:
      identifying a fact table;
      creating a database dimension; and
      adding the database dimension to a measure group as a fact dimension, wherein a fact dimension is a dimension of a multidimensional database whose size and granularity is the same or close to those of the fact table, and wherein a standard dimension is a dimension that is not a fact dimension;
   a receiver component that receives a query that includes one or more standard dimensions and the fact dimension associated with the fact table; and
   a processor component that receives the query from the receiver component and evaluates the query against a multidimensional data structure, wherein the processor component includes the following components:
      a scope component that limits the scope of the query in accordance with the one or more standard dimensions such that the query returns an intermediate result set based on the one or more standard dimensions;
      a selection component that selects only fact dimension members from the fact dimension that correspond to the intermediate result set such that not all fact dimension members in the fact dimension are selected; and
      an aggregation component that aggregates the intermediate result set with the selected fact dimension members to generate a result set.

2. The system of claim 1, further comprising:
materializing the selected fact dimension members.

3. The system of claim 1, wherein the fact dimension defines a one to one relationship with respect to the fact table.

4. The system of claim 1, the query is received in Multidimensional Expression (MDX).

5. A method of querying a multidimensional data cube comprising:
   defining a fact dimension prior to receiving queries, wherein defining a fact dimension comprises:
      identifying a fact table;
      creating a database dimension; and
      adding the database dimension to a measure group as a fact dimension, wherein a fact dimension is a dimension of a multidimensional database whose size and granularity is the same or close to those of the fact table, and wherein a standard dimension is a dimension that is not a fact dimension;
   receiving a query at a processor, the query including one or more standard dimensions and the fact dimension associated with the fact table;
   processing the query by performing the following:
      limiting the scope of the query to the one or more standard dimensions such that the query returns an intermediate result set based on the one or more standard dimensions;
      selecting only fact dimensions members from the fact dimension that correspond to the intermediate result set such that not all fact dimension members in the fact dimension are selected; and
      aggregating the intermediate result set with the selected fact dimension members to generate a result set.

6. A computer readable storage medium having stored thereon computer executable instructions that, when executed by a processor, carry out the method of claim 5.

7. The method of claim 5, further comprising materializing the selected fact dimension members.

8. The method of claim 5, wherein receiving a query comprises receiving a query in Multidimensional Expression (MDX).

9. The method of claim 5 further comprising generating a separate view to unite partition tables in a relational database when the fact dimension is defined on a partitioned group.

* * * * *